United States Patent
Pi et al.

(10) Patent No.: US 10,481,318 B2
(45) Date of Patent: Nov. 19, 2019

(54) LED PANEL LIGHT AND FRAME COMPONENT FOR LED PANEL LIGHT

(71) Applicant: ZOPOISE TECHNOLOGY (ZHUZHOU) CO., LTD., Zhuzhou, Hunan Province (CN)

(72) Inventors: Bruce Pi, Zhuzhou (CN); Baohong Zhao, Zhuzhou (CN)

(73) Assignee: ZOPOISE TECHNOLOGY (ZHUZHOU) CO., LTD., Zhuzhou (CN)

(*) Notice: Subject to any disclaimer, the term of this patent is extended or adjusted under 35 U.S.C. 154(b) by 134 days.

(21) Appl. No.: 15/280,444

(22) Filed: Sep. 29, 2016

(65) Prior Publication Data

US 2017/0343723 A1 Nov. 30, 2017

(30) Foreign Application Priority Data

May 30, 2016 (CN) .......................... 2016 1 0367925

(51) Int. Cl.
*F21V 8/00* (2006.01)
*F21V 17/10* (2006.01)
*F21Y 115/10* (2016.01)

(52) U.S. Cl.
CPC ............ *G02B 6/0025* (2013.01); *F21V 17/10* (2013.01); *G02B 6/005* (2013.01); *G02B 6/0088* (2013.01); *G02B 6/0093* (2013.01); *F21Y 2115/10* (2016.08)

(58) Field of Classification Search
CPC .... G02B 6/0025; G02B 6/005; G02B 6/0088; G02B 6/0091; G02B 6/0093; G02B 6/0051; F21V 17/10; F21Y 2115/10

USPC ........................................................ 362/612
See application file for complete search history.

(56) References Cited

U.S. PATENT DOCUMENTS

2014/0104538 A1* 4/2014 Park ................ G02F 1/133608
349/60
2015/0029753 A1 1/2015 Na et al.

FOREIGN PATENT DOCUMENTS

CN 103175024 A 6/2013
CN 205678602 U 11/2016

OTHER PUBLICATIONS

CN Office Action in application No. 201610367925.9 filed Jun. 4, 2018.
CN Office Action in Application No. 201610367925.9 dated Jan. 25, 2019.

* cited by examiner

*Primary Examiner* — Anh T Mai
*Assistant Examiner* — Hana S Featherly
(74) *Attorney, Agent, or Firm* — Maschoff Brennan

(57) ABSTRACT

The invention provides an LED panel light and a frame component. The frame component includes a frame and a moving plate, wherein the moving plate is assembled at the inner side of the frame movably, an extrusion space is formed between the opposite faces of the moving plate and the frame, an expansion piece is assembled in the extrusion space, the moving plate is close to a light guide plate located at the inner side of the moving plate due to an extrusion counterforce of the expansion piece, and the side face of the moving plate in the face of the light guide plate is provided with a light source assembling area for assembling a light source component.

10 Claims, 3 Drawing Sheets

LED PANEL LIGHT AND FRAME COMPONENT FOR LED PANEL LIGHT

CROSS REFERENCE TO RELATED APPLICATIONS

This application is based upon and claims priority to Chinese Patent Application 2016103679259, filed on May 30, 2016, the entire contents of which are incorporated herein by reference.

TECHNICAL FIELD

The invention relates to the field of luminaire technology, and more particular, to an LED panel light and a frame component.

BACKGROUND

LED panel lights can be embedded in ceiling, wall and the surface of an installation body. The light penetrating through a light guide plate with high transparency forms a uniform plane lighting effect, which has good luminance uniformity and gentle, comfortable and bright light ray, thus effectively relieving eye strain and fatigue. However, the frame, the light guide plate, the light source component and the like of the existing LED panel light have high precision request for installation position and complicated production process; moreover, the light guide plate and the light source component are installed in a staggered manner, which causes that a large portion of the light rays sent from the light source is lost to be unable to send out from the light existing surface of the light guide plate.

Therefore, a more preferred structure is urgently needed to solve the foregoing defects of the existing LED panel light.

SUMMARY

The invention provides an LED panel light and a frame component therefore, which are at least configured to solve the technical defects of serious light loss, complicated production process, high request for assembly precision and the like of the LED panel light in the prior art.

The invention provides a frame component which includes a frame and a moving plate, wherein the moving plate is assembled at the inner side of the frame movably, an extrusion space is formed between the opposite faces of the moving plate and the frame, an expansion piece is assembled in the extrusion space, the moving plate is close to a light guide plate located at the inner side of the moving plate due to an extrusion counterforce of the expansion piece, and the side face of the moving plate in the face of the light guide plate is provided with a light source assembling area for assembling a light source component.

Preferably, the opposite faces of the moving plate and the frame are provided with anti-slip areas and the anti-slip areas are configured to limit the expansion piece to keep in the extrusion space.

Preferably, the anti-slip areas are configured to be one or more combinations:

wave curved surfaces or frosted surfaces, the opposite faces of the moving plate and the frame are provided with salient points, the opposite faces of the moving plate and the frame are provided with a limiting station respectively, and the limiting station is located at the top of the extrusion space.

Preferably, the lower portions of the opposite faces of the moving plate and the frame are provided with an inserting portion for assembling respectively and two inserting portions are mutually inserted to ensure the moving plate to translate between the frame and the light guide plate.

Preferably, the light source assembling area is provided with a clamping slot, the clamping slot includes two clamping walls that are relative to each other up and down, the outer edge of the clamping wall is bent towards the opposite clamping wall respectively to form a limiting portion, and the clamping slot is configured to limit the light source component to locate in a preset position.

Preferably, the expansion piece includes one or more combinations of a rubber strip, a spring or a spring plate.

The invention further provides an LED panel light which includes a back plate, a light guide plate, a light source component and a frame component, wherein the frame component employs any foregoing frame component, the back plate is connected with the frame of the frame component and covers the top of a transformation space surrounded by the moving plate and the frame of the frame component, the outer edge face of the light guide plate is opposite to the moving plate, the light source component is located between the opposite faces of the light guide plate and the moving plate and is assembled in the moving plate, and the extrusion counterforce of the expansion piece of the frame component enables the moving plate to drive the light source component to be close to the outer edge face of the light guide plate.

Preferably, the center of the light source of the light source component and that the center of the light guide plate are located in the same plane.

Preferably, the moving plate is parallel to the outer edge face of the light guide plate.

Preferably, the light guide plate, a foam located thereabove and a diffusion plate located therebelow form steps adaptive to the clamping slot in the moving plate in a staggered manner.

Compared with the prior art, the LED panel light and the frame component provided by the invention at least can obtain the technical effects as follows:

1) the moving plate moves transversely and is close to the light guide plate via the extrusion and deformation of the expansion piece, which eliminates the clearance between the light guide plate and the light source, thus achieving the light from the light source is sent out from the light exiting surface of the light guide plate without loss and improving the lighting effect of the LED panel light.

2) an improved frame structure is employed so that the LED panel light can be suitable for various specifications of light sources and various specifications of light guide plates, which reduces the size precision requirements for the frame and the light guide plate, simplifies the production process, reduces the production cost, and achieves a qualitative breakthrough in structure.

BRIEF DESCRIPTION OF THE DRAWINGS

In order to more clearly illustrate the technical scheme in the prior art or the present invention, the drawings as required to use in the description of the prior art or the embodiments are simply introduced hereinafter. Obviously, the drawings in the description hereinafter are some embodiments of the invention. Those skilled in the art can further acquire other drawings according to these drawings at the premise without giving creative work.

Figure 1:
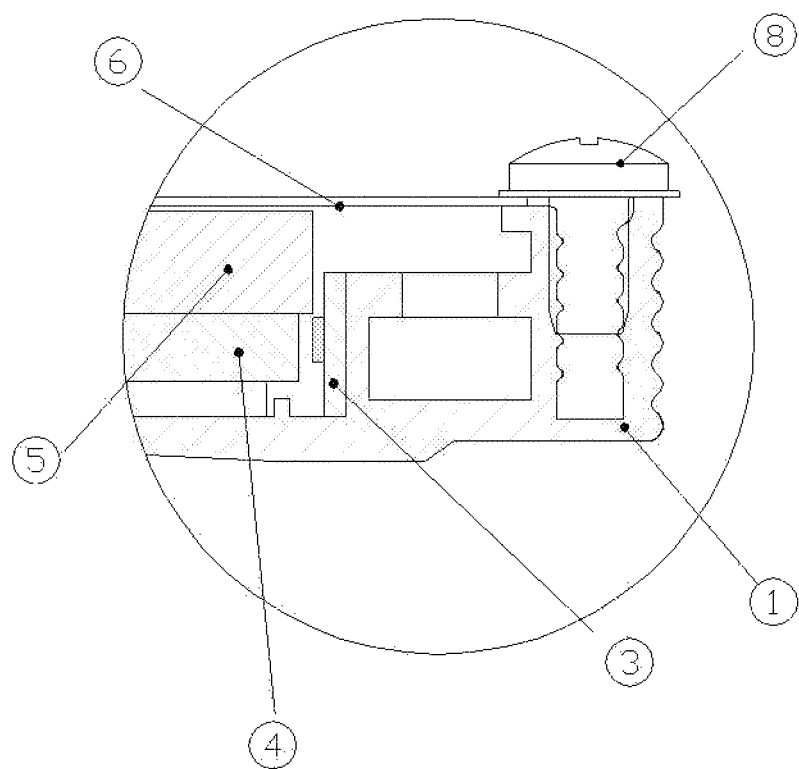
FIG. 1 is a schematic structural diagram of a panel light in the prior art.

1. Frame
2. Moving plate
3. Light source component
4. Diffusion plate
5. Light guide plate
6. Foam
7. Back plate
8. Screws
9. Expansion piece

DETAILED DESCRIPTION

In order to make the objectives, technical solutions and advantages of the embodiments of the present invention more clearly, the technical solutions in the preset invention will be described clearly and completely with reference to the drawings in the present invention. Apparently, the embodiments described are partial embodiments of the present invention, rather than all embodiments. Other embodiments figured out by those having ordinary skills in the art on the basis of the embodiments of the present invention without going through creative efforts shall all within the protection of the present invention.

FIG. 1 represents a structural diagram of the existing LED panel light. The frame 1 and the back plate 7 are fixedly connected via screws 8, the light source component 3 is fixed in the frame, and in order to meet the light transmission matching requirements of the light source component 3 and the light guide plate 5, the installation precision requirement for the frame 1 is very high, which leads to the complicated production process of the frame 1. Moreover, the fixedly connection relation between the frame 1 and the light source component 3, as well as the fixed position relation between the back plate 7 and the foam 6 lead to a clearance between the light source component 3 and the light guide plate 5, which results in a mass of light loss.

According to the LED panel light and the frame component provided by the invention, the moving plate 2 is added between the frame 1 and the light guide plate 5 by optimizing the structure of the frame component, the light source component 3 can be driven to be close to the light guide plate 5 via the motion of the moving plate 2. This can eliminate the clearance between the light source and the light guide plate 5 to enable the light to send out from the light exiting surface of the light guide plate 5 without loss. Moreover, the position requirement of the light guide plate 5 and the light source component 3 can be met by adjusting the position of the moving plate 2. Therefore, it can reduce the installation precision request for the frame component, simplify the production process and reduce the cost.

The LED panel light and the frame component provided by the invention are described in details hereunder with reference to the drawings.

Figure 2:
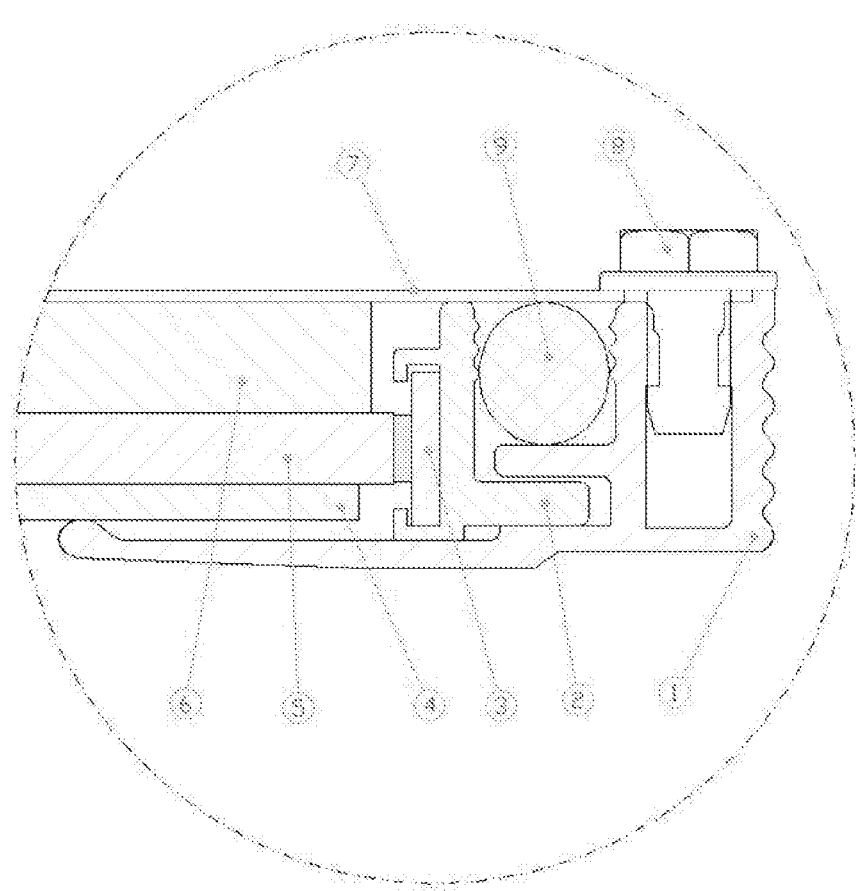
FIG. 2 is a schematic structural diagram of a frame component of the invention.

Referring to FIG. 2, the invention provides a frame component which includes a frame 1 and a moving plate 2, wherein the moving plate 2 is assembled at the inner side of the frame 1 movably, an extrusion space is formed between the opposite faces of the moving plate 2 and the frame 1, an expansion piece 9 is assembled in the extrusion space, the moving plate 2 is close to a light guide plate 5 located at the inner side of the moving plate 2 via an extrusion counterforce of the expansion piece 9, and the side face of the moving plate 2 in the face of the light guide plate 5 is provided with a light source assembling area for assembling a light source component 3.

To be specific, there is no fixed mechanism between the moving plate 2 and the frame 1, both the two are connected movably. The moving plate 2 can move between the frame 1 and the light guide plate 5. The moving displacement of the moving plate 2 is controlled by the expansion piece. Preferably, the expansion piece 9 includes one or more combination of a rubber strip, a spring or a spring plate, wherein, for the rubber strip, the rubber strip may include silica gel, natural rubber, acrylonitrile-butadiene rubber and fluororubber, etc. The extrusion counterforce of the expansion piece 9 can be determined according to the distance between the moving plate 2 and the light guide plate 5. Preferably, the diameter of the expansion piece 9 can be greater than the distance between the light guide plate 5 and the frame 1, so that the expansion piece is subject to an enough high extrusion force to apply an enough high driving force to the moving plate 2, ensuring that the moving plate 2 moves an enough displacement to the side of the light guide plate 5 to enable the light source component 3 installed in the moving plate to be close to the light guide plate 5.

The moving displacement of the moving plate between the light guide plate 5 and the frame 1 can be obtained by selecting different expansion pieces 9, so that the light source component 3 is transmitted to different positions, to realize that the light source components 3 with different sizes are pushed to the appointed position to expand the use range of the existing frame 1.

In one optional embodiment, the opposite faces of the moving plate 2 and the frame 1 are provided with anti-slip areas and the anti-slip areas are configured to limit the expansion piece 9 to keep in the extrusion space.

In the embodiment, when the expansion piece 9 is placed in the extrusion spaced surrounded by the moving plate 2 and the frame 1, it may be taken off from the extrusion space due to the larger extrusion force. In order to avoid the expansion piece 9 from taking off, anti-slip areas are provided in the side wall of the extrusion space in the embodiment, so as to provide an enough friction force to place the expansion piece to not take off from the extrusion space.

In one optional embodiment, the anti-slip areas can be set as one or the combination of more structures:

wave curved surfaces or frosted surfaces, the opposite faces of the moving plate and the frame are provided with salient points, the opposite faces of the moving plate and the frame are provided with a limiting station respectively, and the limiting station is located at the top of the extrusion space.

FIG. 2 only represents the structure form of the wave curved surfaces. It is visible that the end portions of the opposite face of the moving plate 2 and the frame 1 are set as the wave curved surfaces. The surface contact between the expansion piece 9 and the side wall of the extrusion space is changed into the line contact via the wave curved surfaces, which may provide forceful anti-slip action. Similarly, the surface contact is changed into the point contact via the frosted surfaces and the salient points, which can also improve the anti-slip effect. The structure of the limiting station is changed from the opening mode to the closed mode or semi-closed mode in the extrusion space, so that the expansion piece 9 can be limited within the extrusion space.

In addition, it should be noted that the foregoing several structural forms of the anti-slip areas are only exemplary, and the other structures with the anti-slip effect shall also fall within the protection scope of the invention. Moreover, multiple anti-slip structures can be combined for use, so as to avoid the expansion piece 9 from taking off from the extrusion space.

In one optional embodiment, the lower portions of the opposite face of the moving plate 2 and the frame 1 are provided with an inserting portion for assembling respectively and two inserting portions are mutually inserted to ensure the moving plate 2 to translate between the frame and the light guide plate 5.

In the embodiment, inserting portions are added for the moving plate 2 and the frame 1. When the frame component is assembled, the inserting portions are configured to assemble and positing the moving plate 2 and the frame 1. When the expansion piece 9 is installed, the inserting portion can limit the motion route of the moving plate 2 to translate close to the outer edge surface of the light guide plate 5.

Taking the inserting portion structure as illustrated in FIG. 2 for example, the bottom of the moving plate 2 is provided with an inserting lug boss, and the bottom of the frame is provided with an inserting slot correspondingly. In the course of assembly, the inserting lug boss is inserted into the inserting slot; while in the course of putting the expansion piece 9 into the extrusion space, the inserting lug boss can translate along the inserting slot to the side of the light guide plate 5, so as to limit the motion track of the moving plate 2. In addition, the inserting lug boss plays a role in supporting at the bottom of the moving plate 2, so as to avoid the inner side face of the moving plate 2 from deflecting in the translation process, thus resulting in not satisfying the requirement for the relative position of the light source component and the light guide plate. Of course, the inserting lug boss of the moving plate 2 and the inserting slot of the frame 1 are interchangeable as long as two structures are mutually matched to realize the insertion.

In one optional embodiment, the light source assembling area is provided with a clamping slot, the clamping slot includes two clamping walls that are relative to each other up and down, the outer edge of the clamping wall is bent towards the opposite clamping wall respectively to form a limiting portion, and the clamping slot is configured to limit the light source component to locate in a preset position.

In the embodiment, the clamping slot is configured to fix the light source component. The position of the clamping slot in the moving plate 2 is determined according to the position requirement of the light guide plate 5 and the light source component 3. Therefore, the existing mode of fixing the light source component in a sticking manner may be changed. The light source component is more precisely positioned and installed via the clamping slot; moreover, the light source component can be directly inserted into the clamping slot, which is convenient to install.

In the embodiment, the light source component is fixed via the clamping slot, which not only takes a more precise positioning effect, but also is convenient to install, thus facilitating achieving automatic and mechanized assembly and production.

The frame component provided by the invention at least has the improvements or advantages as follows:

1) the added moving plate can freely move between the light guide plate and the frame. As a supplement of the frame, the moving plate can extend the frame to different sizes or structures to adapt to the sizes of different light source components, thus reducing the requirement for the size precision of the frame, simplifying the production process, and reducing the cost.

2) the light source component is fixed on the moving plate via the clamping slot, which ensures the position precision of the light source component, as well as is convenient to install, and is easy to achieve the automatic and mechanized assembly and production.

Figure 3:
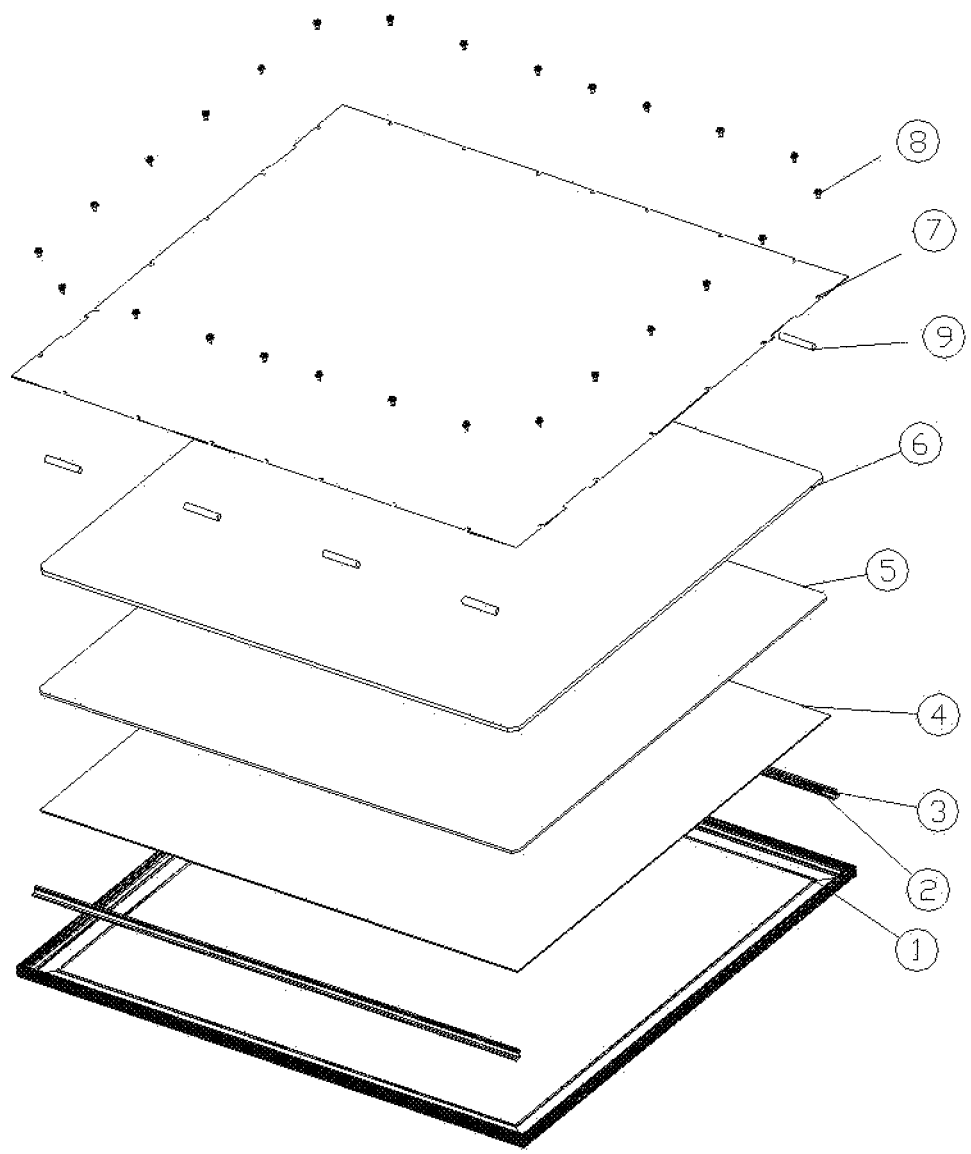
FIG. 3 is a schematic diagram for assembling an LED panel light of the invention.

Referring to FIG. 3, the invention further provides an LED panel light which includes a back plate 7, a light guide plate 5, a light source component 3 and a frame component, wherein the frame component employs the frame component provided by any foregoing embodiment, the back plate 7 is connected with the frame 1 of the frame component and covers the top of a transformation space surrounded by the moving plate 2 and the frame 1 of the frame component, the outer edge face of the light guide plate 5 is opposite to the moving plate 2, the light source component is located between the opposite faces of the light guide plate 5 and the moving plate 2 and is assembled in the moving plate 2, and the extrusion counterforce of the expansion piece 9 of the frame component enables the moving plate 2 to drive the light source component 3 to be close to the outer edge face of the light guide plate 5.

To be specific, the back plate 7 and the frame 1 are connected as a whole via the screws 8. The light guide plate 5, the diffusion plate 4, the foam 6, the moving plate 2, the expansion piece 9 and the like are assembled in the assembly space surrounded by the back plate 7 and the frame 1. The moving plate 2 is movably clamped between the bottom face of the frame 1 and the back plate 7, preferably, the plate face of the moving plate 2 can be perpendicular to the plate face of the back plate 7 and the bottom face of the frame 1, and the clamping action of the back plate 7 and the frame 1 can ensure the motion track of the moving plate 2 is translation. The back plate 7 covers the top of the transformation space. The expansion piece 9 can be pressed by the connection of the back plate 7 and the frame 1 so as to maintain the deflection of the back plate, so that the light source component 3 close to the light guide plate 5 is unlikely to move again.

The expansion piece 9 pushes the moving plate 2 to move towards the outer edge surface of the light guide plate 5, the moving plate 2 drive the light source component 3 fixed thereon to be close to the outer edge surface of the light guide plate 5, preferably, the light source can be close to contact with the outer edge surface of the light guide plate 5, so as to eliminate the clearance between the light source component 3 and the light guide plate 5. In this way, all the light from the light source can be shot into the outer edge surface of the light guide plate 5 without loss and exited from the light exiting surface of the light guide plate 5, so as to optimize the light effect of the panel light.

In one optional embodiment, the center of the light source of the light source component 2 and that of the light guide plate 5 are located in the same plane.

To be specific, in order to provide wider adaptation, the clamping slot on the moving plate 2 for assembling the light source component 3 can be subject to the position adjustment on the moving plate, for example, upper and lower translations; or the side wall of the clamping slot can be freely subject to position adjustment and tighten the light source component. Thus the light source component is fixed in different horizontal positions in response to the light guide plates with different thicknesses to maintain the center of the light source and that of the light guide plate 5 in the same plane, which can further reduce the light loss.

In one optional embodiment, the outer edge face of the moving plate 2 is parallel to that of the light guide plate 5. The embodiment can further ensure that the light source component 3 translates along a straight line perpendicular to the light guide plate 5, so as to ensure the light can perpendicularly emit into the outer edge surface of the light guide plate 5 when the light source component 3 is close to the light guide plate 5, so as to avoid light loss.

In one optional embodiment, referring to FIG. 3, the light guide plate 5, a foam 6 located thereabove and a diffusion plate 4 located therebelow form steps adaptive to the clamping slot in the moving plate 2 in a staggered manner.

To be specific, the outer edge surface of the light guide plate 5 relative to the moving plate 2 is extruded out of the outer edge surface of the diffusion plate 4 and the foam 6 that are adjacent to the light guide plate 5, and forms steps matched with the clamping slot in the moving plate 2 with the diffusion plate 4 and the foam 6, so that the light source can smoothly contact the outer edge surface of the light guide plate 5.

The LED panel light provided by the invention at least can have the technological changes or advantageous effects as follows:

1) the moving plate moves transversely and is close to the light guide plate via the extrusion and deformation of the expansion piece, which eliminates the clearance between the light guide plate and the light source, thus achieving the light from the light source is sent out from the light exiting surface of the light guide plate without loss, and improving the lighting effect of the LED panel light.

2) an improved frame structure is employed so that the LED panel light can be suitable for various specifications of light sources and various specifications of light guide plates, which reduces the size precision requirements for the frame and the light guide plate, simplifies the production process, reduces the production cost, and achieves a qualitative breakthrough in structure.

3) the assembly is simple, the installation is convenient, the installation precision requirement is low, and it is easy to achieve automatic and mechanized production.

It should be finally noted that various embodiments above are merely employed to describe the technical solution of the present invention, but not limit thereto. Although the present invention is described in detail with reference to various embodiments above, those ordinary skilled in the art should understand: the technical solutions listed in various embodiments above may be stilled modified, or a part of or all technical features may be equivalently replaced; and these modifications or replacements do not enable the essence of the corresponding technical solution to depart from the spirit and the scope of the technical solutions of various embodiments of the present invention.

What is claimed is:

1. A frame component, comprising:
    a frame and a moving plate, wherein the frame comprises a bottom portion and an edge portion, the moving plate is movably assembled at the inner side of the edge portion of the frame,
    an extrusion space is formed between the opposite faces of the moving plate and the edge portion of the frame, an expansion piece is assembled in the extrusion space, the side face of the moving plate in the face of a light guide plate is provided with a light source assembling area for assembling a light source component, and the moving plate is close to the light guide plate located at the inner side of the moving plate due to an extrusion counterforce of the expansion piece, thereby eliminating the clearance between the light guide plate and the light source.

2. The frame component according to claim 1, wherein the opposite faces of the moving plate and the frame are provided with anti-slip areas and the anti-slip areas are configured to limit the expansion piece to keep in the extrusion space.

3. The frame component according to claim 2, wherein the anti-slip areas are configured to be one or more combinations:
    wave curved surfaces or frosted surfaces,
    the opposite faces of the moving plate and the frame are provided with salient points, and
    the opposite faces of the moving plate and the frame are provided with a limiting station respectively, and the limiting station is located at the top of the extrusion space.

4. The frame component according to claim 1, wherein the lower portions of the opposite faces of the moving plate and the frame are provided with an inserting portion for assembling respectively and two inserting portions are mutually inserted to ensure the moving plate to translate between the frame and the light guide plate.

5. The frame component according to claim 1, wherein the light source assembling area is provided with a clamping slot, the clamping slot comprises two clamping walls that are relative to each other up and down, the outer edge of the clamping wall is bent towards the opposite clamping wall respectively to form a limiting portion, and the clamping slot is configured to limit the light source component to locate in a preset position.

6. The frame component according to claim 1, wherein the expansion piece comprises one or more combinations of a rubber strip, a spring or a spring plate.

7. An LED panel light, comprising a back plate, a light guide plate, a light source component and a frame component, wherein the frame component employs the frame component according to claim 1, the back plate is connected with the frame of the frame component and the back plate covers the top of a transformation space surrounded by the moving plate and the frame of the frame component, the outer edge face of the light guide plate is opposite to the moving plate, the light source component is located between the opposite faces of the light guide plate and the moving plate and the light source component is assembled on the moving plate, and the extrusion counterforce of the expansion piece of the frame component enables the moving plate to drive the light source component to be close to the outer edge face of the light guide plate.

8. The panel light according to claim 7, wherein the center of the light source of the light source component and the center of the light guide plate are located in the same plane.

9. The panel light according to claim 7, wherein the moving plate is parallel to the outer edge face of the light guide plate.

10. The panel light according to claim 7, wherein the light guide plate, a foam located thereabove and a diffusion plate located therebelow form steps adaptive to the clamping slot in the moving plate in a staggered manner.

* * * * *